United States Patent
Fairman et al.

(10) Patent No.: US 6,996,722 B1
(45) Date of Patent: Feb. 7, 2006

(54) DATA COMMUNICATIONS

(75) Inventors: Ian R Fairman, Ipswich (GB); Robert J Briscoe, Woodbridge (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/555,839

(22) PCT Filed: Dec. 15, 1998

(86) PCT No.: PCT/GB98/03755

§ 371 (c)(1), (2), (4) Date: Jun. 6, 2000

(87) PCT Pub. No.: WO99/33224

PCT Pub. Date: Jul. 1, 1999

(30) Foreign Application Priority Data

| Dec. 19, 1997 | (EP) | 97310358 |
| Dec. 19, 1997 | (GB) | 9726934 |
| Jun. 4, 1998 | (EP) | 98304429 |
| Jun. 4, 1998 | (GB) | 9812060 |

(51) Int. Cl.
*H04L 9/32* (2006.01)
*H04L 9/00* (2006.01)
*H04N 7/167* (2006.01)

(52) U.S. Cl. ............ 713/192; 713/170; 713/171; 713/172; 713/173; 713/174; 380/239; 380/262

(58) Field of Classification Search ......... 713/192, 713/170, 171, 172, 173, 174; 380/262, 239

See application file for complete search history.

(56) References Cited

U.S. PATENT DOCUMENTS

| 5,148,485 | A | | 9/1992 | Dent |
| 5,301,233 | A | | 4/1994 | Coutrot et al. |
| 5,467,134 | A | | 11/1995 | Laney et al. |
| 5,483,598 | A | | 1/1996 | Kaufman et al. |
| 5,544,161 | A | * | 8/1996 | Bigham et al. ............ 370/397 |
| 5,584,023 | A | | 12/1996 | Hsu |
| 5,652,868 | A | | 7/1997 | Williams |
| 5,710,815 | A | | 1/1998 | Ming et al. |
| 5,787,179 | A | | 7/1998 | Ogawa et al. |

(Continued)

FOREIGN PATENT DOCUMENTS

EP 0528730 A1 8/1992

(Continued)

OTHER PUBLICATIONS

Popp et al, "Security Service for Telecommunications Users" Bringing Telecommunication Services to the People—ISS & N 1995, Third International Conference on Intelligence in Broadband Service and Networks, Heraklion, Crete, Oct. 16-19, 1995. Proceedings, NO Conf. 3, Oct. 16, 1995, pp. 28-39, XP 000593466.

(Continued)

*Primary Examiner*—Matthew Smithers
*Assistant Examiner*—Courtney Fields
(74) *Attorney, Agent, or Firm*—Nixon & Vanderhye P.C.

(57) ABSTRACT

In a data communications system a remote data source outputs data as a series of application data units (ADUs). Each ADU is individually encrypted with a different key. The keys are transmitted (for example using Internet multicasting) via a communications network to one or more customer terminals. At the terminals a sequence of keys is generated for use in decrypting the ADUs. A record is kept of the keys generated, and this record may subsequently be used to generate a receipt for the data received by the customer. The keys may be generated, and the record stored within a secure module such as a smartcard.

36 Claims, 9 Drawing Sheets

U.S. PATENT DOCUMENTS

| | | |
|---|---|---|
| 5,937,067 A | 8/1999 | Thatcher et al. |
| 6,055,314 A * | 4/2000 | Spies et al. ................. 380/228 |
| 6,222,924 B1 | 4/2001 | Salomaki |
| 6,351,538 B1 | 2/2002 | Uz |
| 6,580,906 B2 | 6/2003 | Bilgic et al. |

FOREIGN PATENT DOCUMENTS

| | | |
|---|---|---|
| EP | 0534419 A2 | 3/1993 |
| WO | WO 93/09627 | 5/1993 |
| WO | WO 97/26611 | 7/1997 |
| WO | WO 97/34426 | 9/1997 |

OTHER PUBLICATIONS

Bottura, Charging and Tariffing Functions and Capabilities for Mans' Proceedings of the Network Operations and Management Symposium (NOM, Memphis, Apr. 6-9, 1992, vol. 1, Jan. 1, 1992, pp. 208-218.

Coffey et al, Non-Repudiation with Mandatory Proof of Receipt: Computer Communications Review, vol. 26, No. 1, Jan. 1, 1996, pp. 6-17, XP000580016.

* cited by examiner

DATA COMMUNICATIONS

BACKGROUND OF THE INVENTION

1. Field of the Invention

The present invention relates to a data communications system, and in particular to a system using an extensive public network such as the Internet.

2. Related Art

Hitherto, users have typically been charged for Internet usage following a subscription model in which they pay a flat-rate fee to an Internet Services Provider (ISP) for access to the Internet and use of network resources is subsequently free of charge. The different networks and routers making up the Internet have then endeavoured to meet the need of any particular application on a "best effort" basis. It has been recognised that this method of operation is not appropriate for applications such as multimedia conferencing which use a lot of network resources, and which ideally require a guaranteed quality of service (QoS). A customer for such services may therefore pay a premium to an Internet service provider in order to receive a guaranteed QoS for a given session, or over an extended period of time. More generally, there may be a need to charge customers according to the amount of data transmitted. This might be used, for example, to provide a charging mechanism for access to on-line data sources, such as a video library.

Where the customer is paying for a certain specified quality of service, or for a certain amount of data received, there arises the problem of resolving any disputes between the customer and the service provider as to the level of service the customer has received in a given period. A customer might, for example, pay for an enhanced QoS level for a session of video conferencing. If however the network or service provider then fails to provide the required QoS, for example because a high proportion of data packets has been lost or because the video source became over-loaded, then the customer might claim a refund. However, while conventional networks, such as the PSTN, incorporate extensive and reliable billing systems which carefully record details of all calls and generate reliable records, no such billing/auditing structure exists within or across the Internet. Moreover, it would be undesirable to incorporate a conventional billing structure in the Internet or any other similar public data network, since this would add considerably to the operational costs of the network. There remains a need therefore for alternative mechanisms for resolving any disputes between parties as to the quality of service which has been delivered.

SUMMARY OF THE INVENTION

According to a first aspect of the present invention, there is provided a method of operating a data communications system comprising:
  a) at a remote data source, outputting a plurality of application data units (ADUs)
  b) encrypting the ADUs;
  c) communicating the ADUs to a customer terminal;
  d) in the locality of the customer terminal, decrypting the ADUs;
  e) storing a record of the ADUs decrypted in step (d); and
  f) subsequently generating a receipt for ADUs received at the customer terminal by reading record data stored in step (e).

The present invention provides a new approach to the generation of an auditable record of the data received by a customer connected to a data communications network. The data source transmits the data as a series of ADUs. These ADUs are typically application-level entities, and need not correspond to the frame structure, if any, of the transmission layer of the network. The ADUs might correspond, for example, to successive minutes of video delivered from a video server or to individual strokes on a white board in a conferencing application. Each successive ADU is then encrypted. The ADU need not be encrypted in a single operation. It may be broken down into packets before encryption. However, the same key is used to encrypt each packet in any one ADU. In order for the customer to be able to use the data, each ADU has to be decrypted. A record is kept of the decryption of the ADUs. This record may comprise a count of the number of ADUs decrypted. This record may itself be encrypted. This then provides a verifiable record which can be used, for example, to resolve disputes as to the number of ADUs received in a given time period.

The invention includes, but is not limited to, data communications systems in which the ADU's are communicated over, e.g., a federated public data network such as the Internet. It also encompasses systems in which the step of communicating ADU's is carried out, e.g., by physically distributing a data carrier such as a CD-ROM containing the ADU's. It also encompasses both multi-cast and uni-cast data communication systems, and systems in which there is more than one data source communicating data to a particular terminal.

The invention it is also applicable in a wide range of contexts, wherever it is necessary control access, and particularly to establish proof of receipt (or of failure to receive) data items. Possible applications include multicast audio/video streams for Video-on-Demand, network radio or surveillance; controlling access to the contents of CD ROMS or other storage media carrying software or multimedia data; controlling access to a set of vouchers giving access to other services; a multicast stream of messages such as stock prices, communications network prices, electricity prices, network management messages, news items, portfolio information, team briefings, standards documents, academic papers, magazines, product reviews, black lists, criminal intelligence, legal precedents, property profiles, pharmaceutical test results etc; a sequence of multicast messages within a network game, virtual world or simulation scenario (e.g. an aptitude exam), possibly just those messages that control access, but also possibly any data messages for which proof of reception is crucial to the fairness of the result of the simulation.

The invention may also be applied in a community of interest network (COIN) or a virtual private network (VPN), as further described below.

As exemplified in the detailed embodiment below, different keys may be used for encryption and decryption of different ADUs. The keys are generated in such a way that it is not practically possible for the customer to predict a key value from previous keys. The record of the decryption of the ADUs may then be derived by storing a count of the number of keys generated at the customer terminal. Other data may also be stored, such as the time of the session and/or the time at which each key is generated.

The customer terminal may be a personal computer or any other appropriate device, such as, for example, a Java-enabled mobile cellular telephone.

Preferably the steps of generating a record (and optionally of generating a plurality of different keys) are carried out by a secure module located at the customer terminal. The secure module provides a region in the customer terminal which is effectively under the control of the data provider, and which is not readily accessible to the customer. The use of such a secure module further enhances the reliability of the stored record. The secure module may be a software module which executes a cryptographic algorithm. This might be implemented, for example, as a Java program distributed by the operator of the remote data source as part of the process of setting up a session. To provide still higher levels of security, it is preferred that the secure module should include a dedicated processor and store located within a tamper-proof unit. Examples of such secure modules include smartcard structures, and cryptographic PC cards.

When the secure module has only a relatively low processing power, as may be the case, for example, when it is a smartcard, then preferably that module is required simply to output the different respective keys. Other processes running in the main part of the customer terminal are then responsible for decrypting the ADUs. Alternatively, when the secure module has more processing power, as when, for example, a cryptographic co-processor card is used, then preferably the encrypted ADUs are passed to the secure module and the module generates a key, decrypts the ADUs, and passes the decrypted ADUs out, for example, to an application programme running on the customer terminal. In this case it is not necessary to generate a new key for each ADU since the key is kept within the secure module.

Preferably the remote data source generates and transmits to the customer terminal a seed value, and the plurality of different keys are generated from the said seed value. A fresh seed value may be used for each session.

The ADUs from the remote data source may be multicast to a plurality of different customer terminals. In this case preferably seed values for the generation of the plurality of different keys are distributed to the plurality of terminals.

Preferably a digital watermark, that is a characteristic variation in the data, is added to the ADUs. This variation may be generated directly in or subsequently to the said step of decrypting the ADUs or a watermarked key may be supplied to decrypt the ADU. In this latter case, the characteristic variation in the key automatically results in a traceable variation in the data decrypted using the key. Digital watermarking is a well-known technique whereby, for example, insignificant bits of a digital data stream may be varied in a characteristic fashion traceable separately to each party receiving the data. If the data is then copied and passed on, the secondary source can be identified by inspecting the insignificant bits. The use of digital watermarking is particularly valuable in the context of the present invention, since it facilitates detection of attempts to undermine the security of the system by collusion between two or more customers, for example by one customer decrypting and retransmitting ADUs.

According to a second aspect of the present invention, there is provided a data communication system comprising:
 a) a remote data source arranged to output a plurality of ADUs;
 b) encryption means for encrypting a plurality of ADUs with different respective keys;
 c) a communications network connected to the encryption means;
 d) a customer terminal connected to the communications network and arranged to receive encrypted ADUs via the communications network;
 e) key generation means located in the locality of the customer terminal and arranged to generate a plurality of different keys for decrypting different respective ADUs; and
 f) a store at the customer terminal for storing a record of keys generated by the decryption means.

Preferably the record in the store is authenticated, for example, using a cryptographic signature.

According to another aspect of the present invention, there is provided a method of operating a data communications system comprising:
 a) at a remote data source, outputting a plurality of ADUs;
 b) encrypting different ones of the plurality of ADUs using different respective keys;
 c) communicating the ADUs to a customer terminal;
 d) in the locality of the customer terminal, generating a plurality of different keys for decrypting different respective ADUs received at the customer terminal; and
 e) storing a record of the keys generated.

According to a further aspect of the present invention there is provided a method of operating a data communications system comprising:
 a) at a remote data source, outputting a plurality of application data units (ADUs);
 b) encrypting the ADUs;
 c) communicating the ADUs to a plurality of customer terminals;
 d) in the locality of each customer terminal, decrypting the ADUs; and
 e) inducing a different characteristic variation in the value of the ADU's at different respective terminals.

The use of digital watermarks in decrypted ADU can advantageously be used also in otherwise conventional systems, including systems in which no receipt is generated.

The invention also encompasses customer terminals and data servers adapated for implementing the invention in any of its aspects.

BRIEF DESCRIPTION OF THE DRAWINGS

Methods and apparatus embodying the present invention will now be described in further detail, by way of example only, with reference to the accompanying drawings in which.

DETAILED DESCRIPTION OF EXEMPLARY EMBODIMENTS

Figure 1:
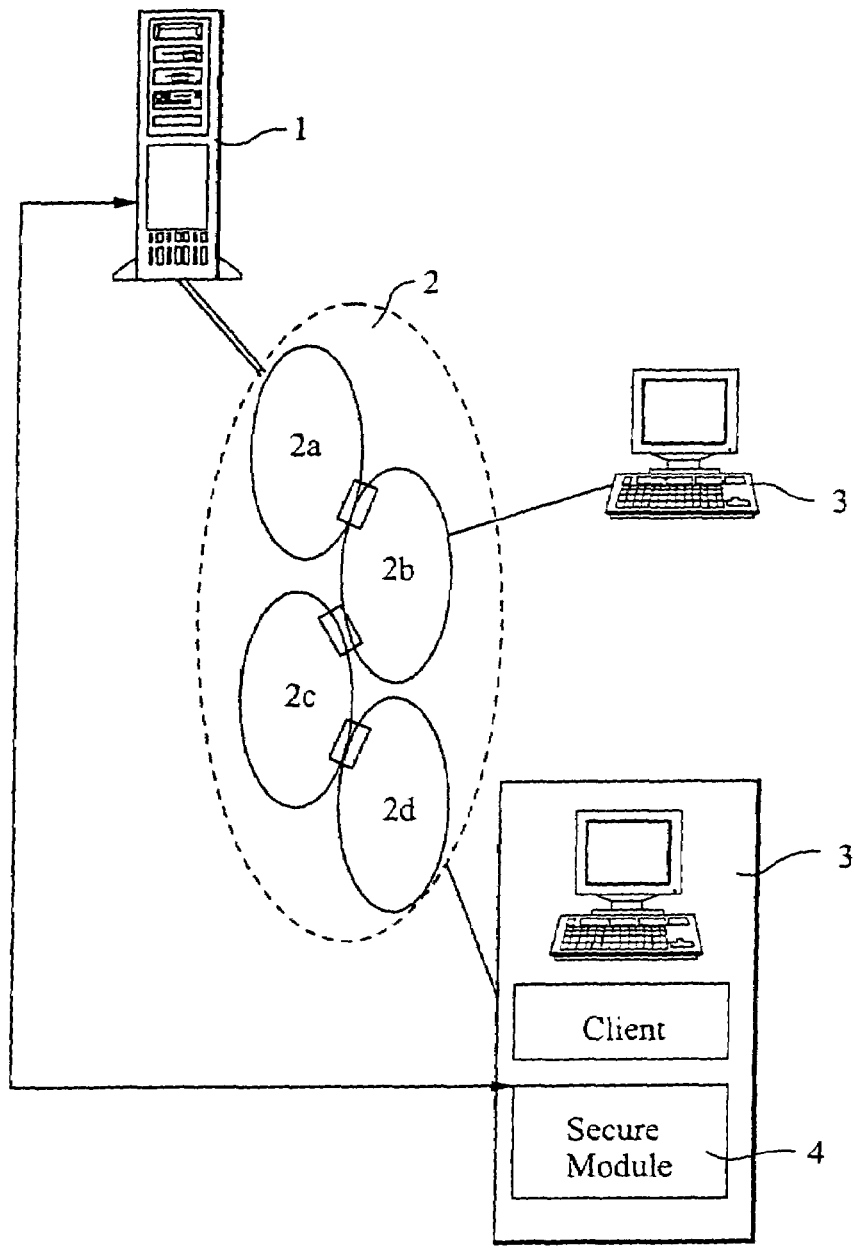
FIG. 1 is a schematic of a data communication system embodying the network.

A data communications system includes a data server 1 connected via a data communications network 2 to a number of customer terminal 3. Although for ease of illustration only two customer terminals are shown, in practice the data server 1 may communicate simultaneously with many terminals. In the present example, the data communications network 2 is the public Internet and is formed from a number of sub-networks 2a–2d. The sub-networks and the associated routers support IP (Internet Protocol) multicasting.

In the present example, the data server 1 is a video server. The data server reads a video data stream from a mass storage device and compresses the data using an appropriate compression algorithm such as MPEG 2. An encryption module in the data server 1 then divides the compressed video data stream into ADUs. For example each ADU may comprise data corresponding to one minute of the video signal. An encryption algorithm then encrypts the ADUs. Suitable encryption algorithms include DES (Data Encryption Standard) (US Federal Standard FIPS PUB46). This is a conventional private key algorithm. A common encryption algorithm is used for all of the ADUs in one session. In this embodiment, a sequence of keys is used, with a different key for each successive ADU. (The ADU referred to in this embodiment is an application-level entity created for the purposes of encryption and is to be distinguished from conventional video "frames").

At each customer terminal, incoming ADUs are processed with the aid of a secure module 4. As described in further detail below, the secure module 4 generates a sequence of keys corresponding to those used originally to encrypt the ADUs. The keys may be passed out to the main processor of the customer terminal to allow the data to be decrypted. Alternatively, the secure module itself may carry out the step of decryption. In either case, the secure module stores a record of the decryption of the ADUs. This record may comprise, for example, a count of the total number of keys issued in the course of a session and hence of the number of ADUs decrypted, together with a session ID and a record of the time of the session. Any ADUs arriving too late or corrupted may be discarded without decryption or without requesting a key to decrypt them.

Prior to commencing a session, a customer terminal 3 may have contracted with the operator of the data network 2 for a quality of service (QoS) which requires a specified minimum number of ADUs to be delivered per unit time. If subsequently, congestion in the network 2 causes the rate of ADU delivery to fall below that specified in the contract, then the customer terminal 3 requests from the data server 1 a refund of charges for the session. To validate this request, the data server 1 requests from the secure module 4 a "receipt". This receipt includes the data recorded in the data store and so provides a tamper-proof indication of the number of ADUs decrypted and made available to the customer in the course of a specified session. In general, this receipt will only be trusted by the party encrypting the data, not a party such as the network operator simply transmitting data encrypted without its knowledge. However, the encryption software used by the data source may be certified by a third party trusted by both the network provider and the data source. If the decryption software is also certified by this trusted third party as described below, it may then sign the receipt on behalf of the trusted third party so that the network operator can trust it.

Figure 2:
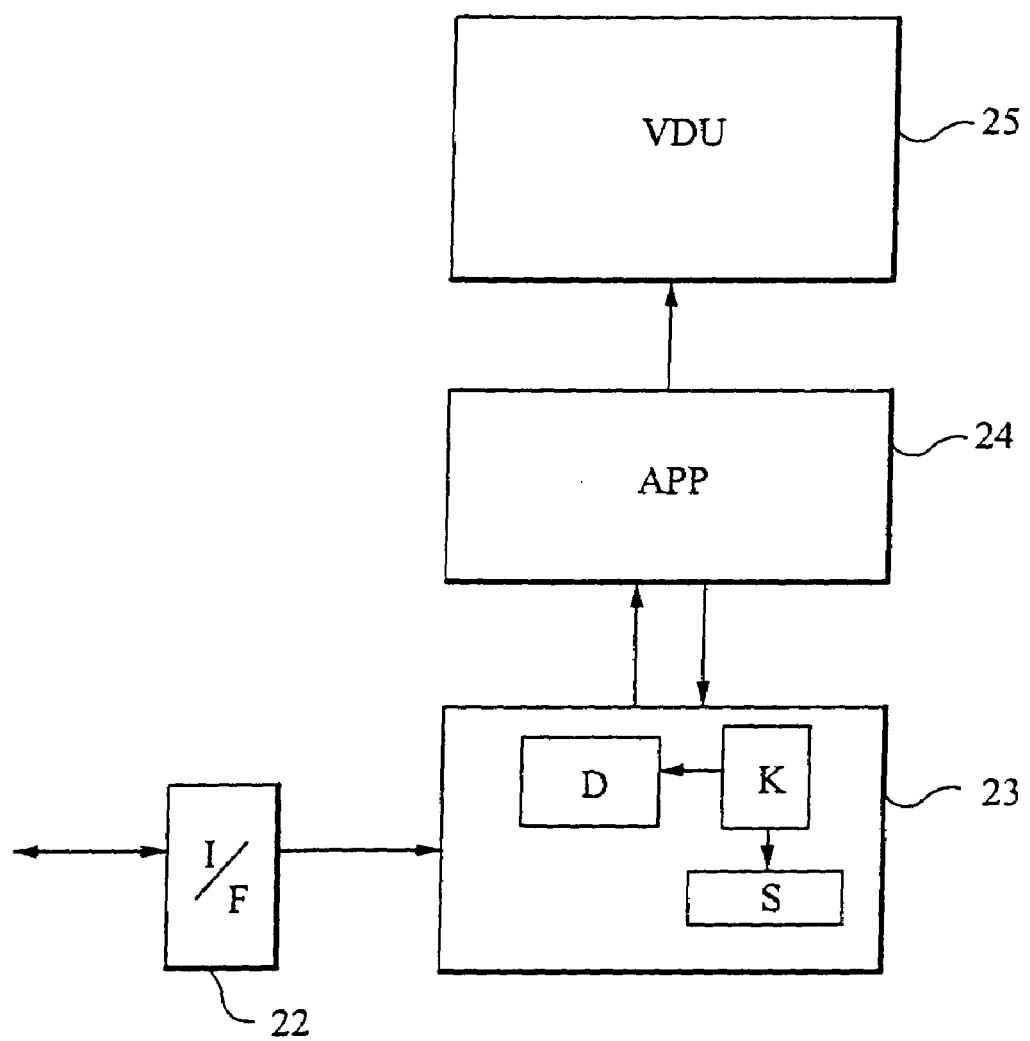
FIG. 2 is a schematic showing in further detail the functional components of the customer terminal in the system of FIG. 1.

FIG. 2 shows the principal functional components of the customer terminal relevant to the present exemplary embodiment. A network interface 22 communicates ADUs to and from the data network. The ADUs pass from the interface 22 to a secure module 23. The secure module 23 has sub-modules comprising a decryption module D a key generation module K and a secure store S. The key generation module passes a series of keys to the decryption module which decrypts a series of ADUs received from the interface 22 and passes these to an application layer module 24. This carries out further processing and passes the resulting data to output device, which in this example is a video display unit VDU 25. In a preferred implementation, the interface 22 may be embodied in hardware by an ISDN modem and in software by a TCP-IP stack. The secure module 23 may be, for example, a smartcard which is interfaced to the customer terminal via a PCMCIA socket. Suitable smartcards are available commercially from Gemplus and other companies. The smartcard may use one of a number of standard data interfaces such as the Java card API (application programmer's interface) of Sun Microsystems, or the Microsoft smartcard architecture. Alternatively, the secure module may be embodied by a PCI cryptographic co-processor card such as that available commercially from IBM.

Figure 9:
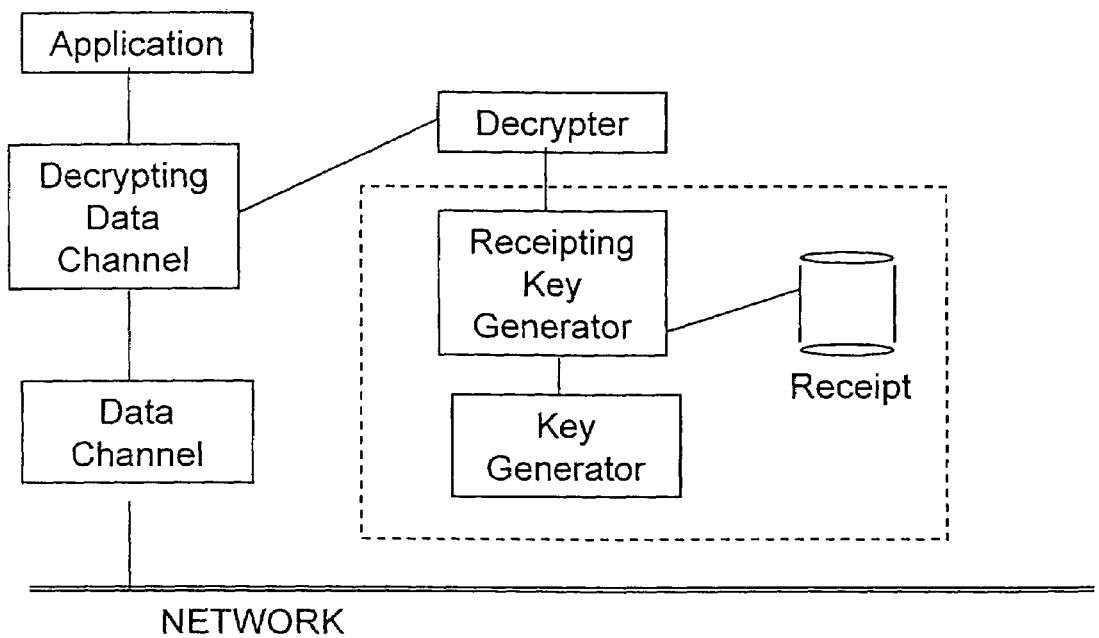
FIG. 9 shows a software architecture for a customer terminal.

FIG. 9 illustrates a software architecture for the customer terminal. The application layer on the terminal is supported by a decrypting data channel which in turn overlies a data channel layer connected e.g. to a network. The decrypting data channel has associated with a decrypter module. This decrypter module calls resources in a secure module (shown within dashed box) comprising a receipting key generator a key generator, and a receipt store. It will be understood that this architecture is given by way of example only, and alternatives are possible within the scope of the invention. For example, the receipt store may be outside the secure module.

Figure 3:
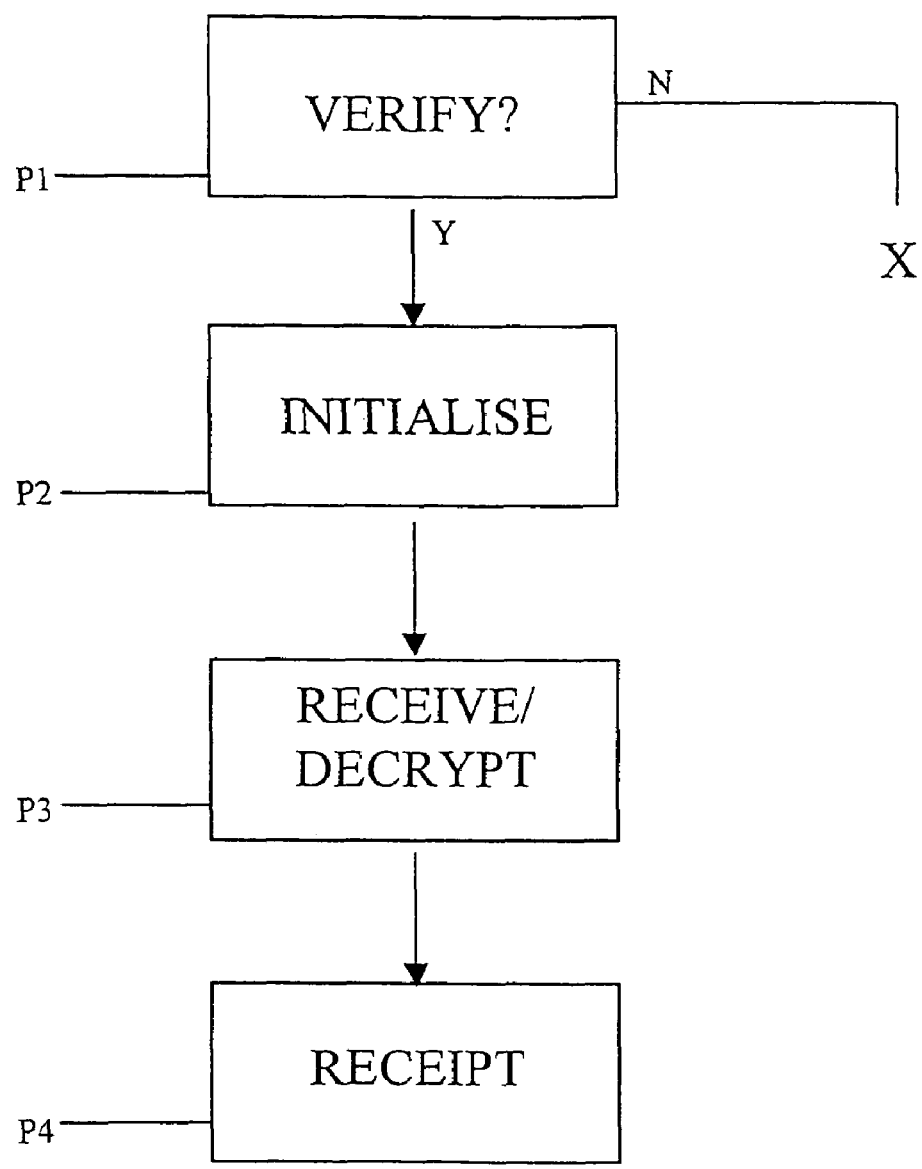
FIG. 3 is a flow diagram showing the principal phases of operation of the system of FIG. 1.

FIG. 3 shows the main phases in the operation of the system described above. In phase P1, the server verifies that the secure module in the customer terminal is trustworthy and has a recognised identity. In phase P2 the secure module is initialised to decode data for a particular session. In phase P3 the data is transmitted and decryption carried out and in stage P4, which is optional, a receipt is generated. These phases will now be described in further detail.

Figure 4:
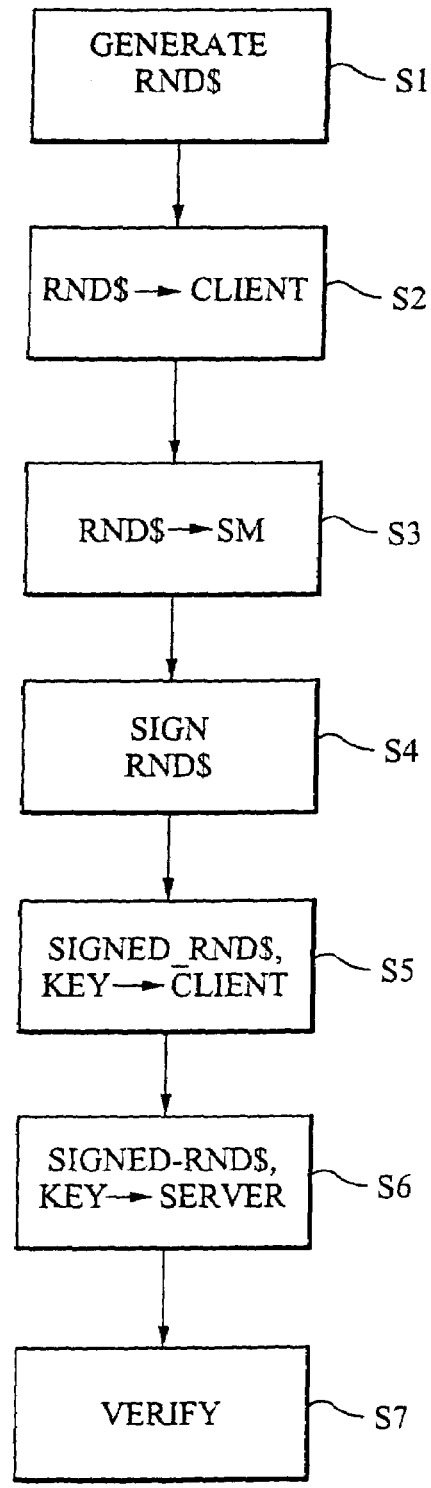
FIG. 4 is a flow diagram showing in further detail the verification phase.

When the secure module is, for example, a smartcard, then that smartcard is issued by the manufacturer with a unique public/private key pair. This key pair may be certified by a trusted third party. In phase P1, the server carries out steps to confirm that the smartcard does indeed come from a trusted supplier. The steps of phase P1 are shown in FIG. 4. In step S1 the server generates a random string. In step S2, the server sends the random string via the data network to the customer terminal. In step S3, the random data string is passed to the secure module (e.g. the smartcard). In step S4 the smartcard signs the random string with its private key. In step S5 the smartcard returns the signed string together with its relevant public key (which has itself been signed by the trusted third party) to the client application running on the customer terminal. In step S6, that client application returns the signed string and the signed public key via the data communications network to the server. In step S7 the server verifies the signed random string.

Figure 5:
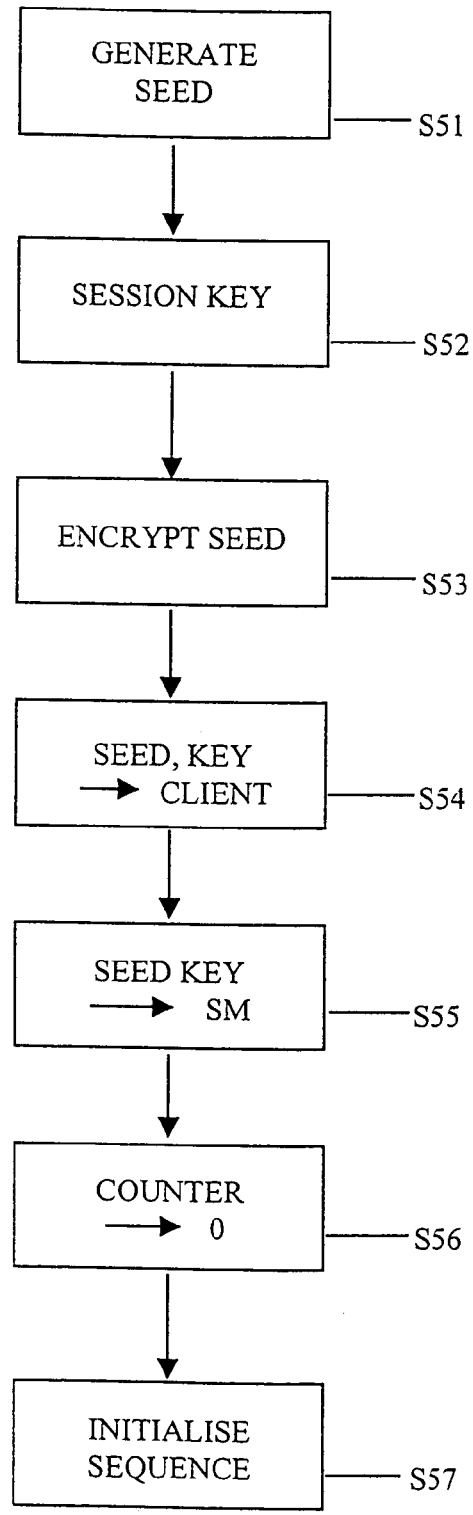
FIG. 5 is a flow diagram showing in further detail the initialisation phase.

As shown in FIG. 5, to set up the secure module to decode data in a particular session, the server first generates (s51) a seed value for use with an appropriate pseudo-random or chaotic function to generate a series of keys. It also generates a session key (s52). The server encrypts the seed value using the secure module's public key (s3). It then transmits the encrypted seed value and the session key to the customer terminal (s54). The client application passes the encrypted seed value and session key on to the secure module (s55). The secure module decrypts the seed value and session key with its private key. The secure module sets an ADU counter to zero (s56) and initialises a sequence generator with the seed value (s57). The customer terminal is then ready to receive and decrypt ADUs.

Figure 6:
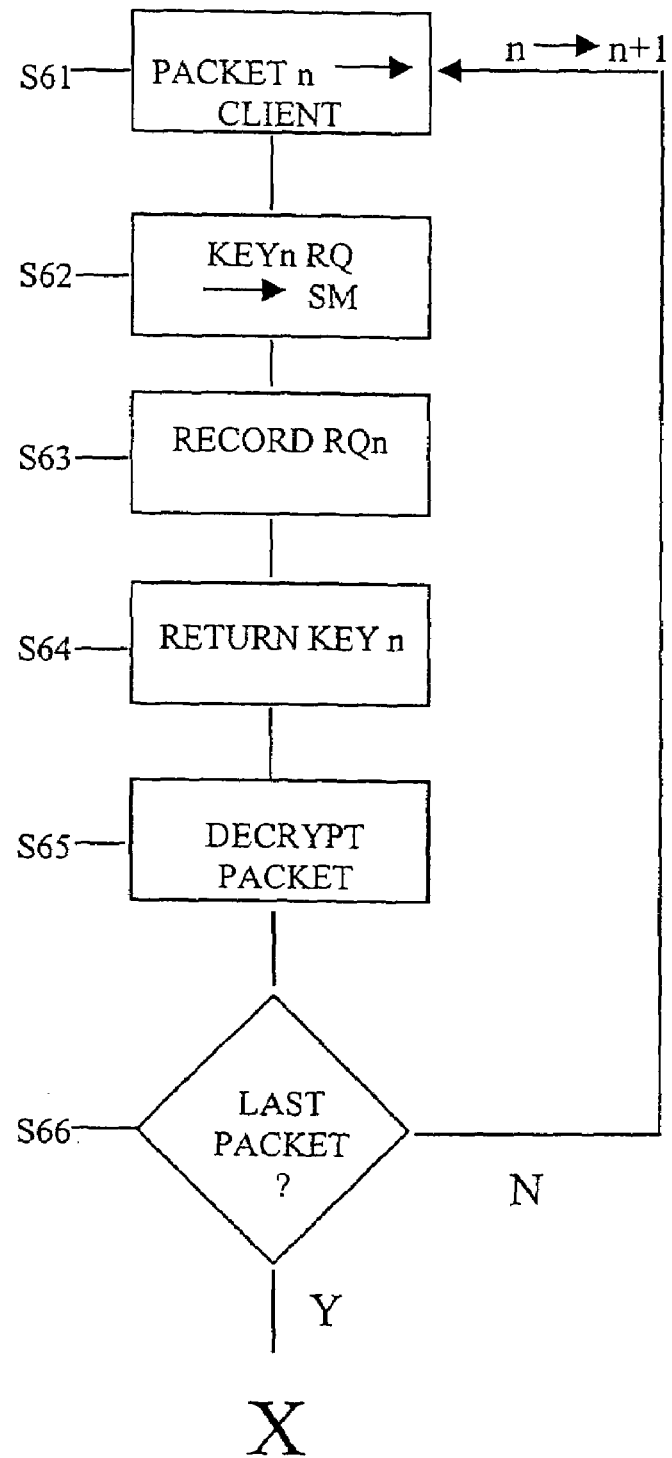
FIG. 6 is a flow diagram showing in further detail the received/decrypt phase.

The server subsequently sends a series of ADUs to the client. Each ADU has an ADU number. Each ADU might also have a session key transmitted with it. The sequence of steps for the nth ADU is illustrated in FIG. 6. In step s61 the server sends the encrypted nth ADU to the client. The client requests the key x for ADU n from the secure module (s62). The secure module records the request (s63). The smartcard then returns the key x to the client (s64). The client deciphers the ADU using x (s65). The client tests to determine whether the ADU is the last of a session (s66). If not then the steps are iterated for the n+1th and subsequent ADUs.

In the step of recording the request (s63) referred to above, the record of the request may simply be stored as a single incrementing counter. However, some stringent scenarios may require audit trails where each detailed record of receipt is stored. If the list of records becomes too large to be stored on the smartcard, it can be hashed and the hash and the time can then be signed using the smartcard's private key, the record, hash and signature then being passed to the client for storage. Subsequently, if further records again become too large, the hash of the previous records can be retrieved from the client by the smartcard, and, having checked the signature of the previous hash is valid, the hash can be prepended to the new records, a new hash generated from the combined new records and old hash, then the new records and new hash can be appended to the old records on the client followed by the digital signature of the new hash. The length of each chunk of hashed records would have to be known by the data source in order to check the signature on the receipt. This may be by a convention, or by including it in a header to the receipt.

Figure 7:
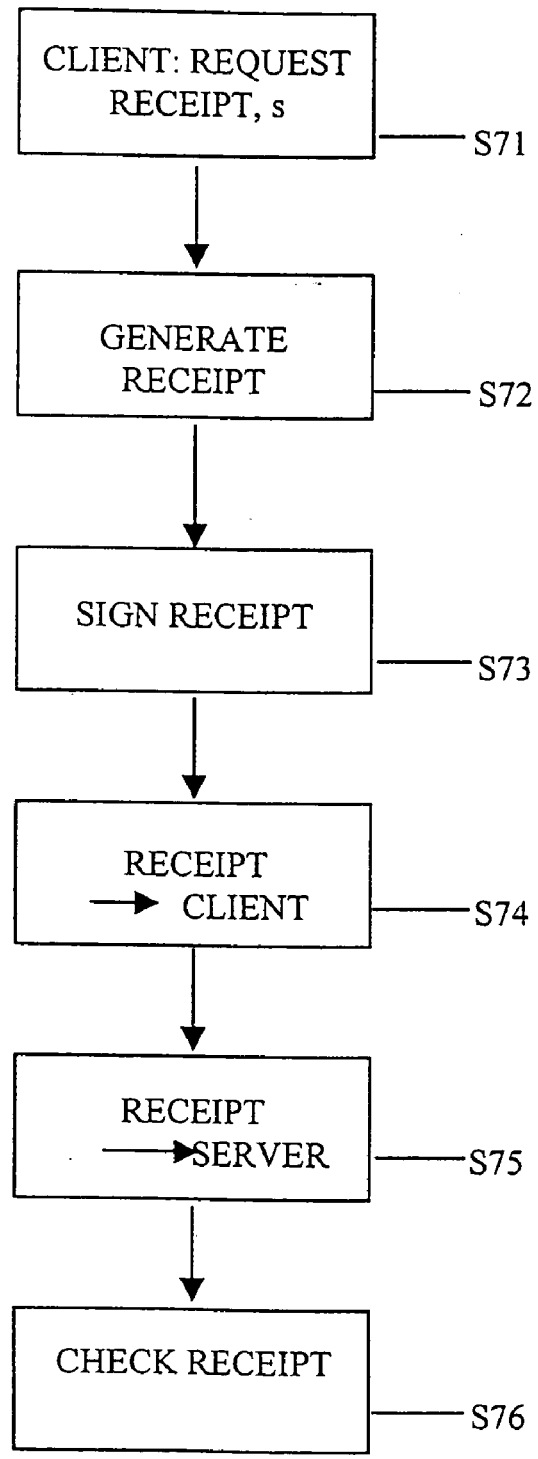
FIG. 7 is a flow diagram showing in further detail the receipt phase.

In setting up the session, the customer has previously negotiated an agreement with the service provider as to the QoS level for the session. For an application such as video on demand this level may be stringent: for example the customer may require that no application-level ADU is lost in transmission. If a ADU arrives too late at the client, it can can be discarded and is effectively considered to have been lost. If then this QoS level is not met, then the customer requests a refund from the service provider. The request for refund might specify, for example, that there was ADU loss at a specified time into the video transmission. In processing such a request, the server requires a receipt from the customer. As shown in FIG. 7, in step s71 the client requests a receipt for a specified session s from the secure module. The secure module reads the data which it recorded for that session and generates a receipt containing that data (s72). The secure module signs the receipt with the secure module's private key (s73). The secure module returns the signed receipt to the client (s74). Alternatively, the secure module may have already signed and stored its receipts on the client terminal if it was short of storage space as described above. When next adding to the data forming the receipt on the client, the secure module The client in turn transmits the signed receipt to the server (s75). The server checks the signature on the receipt using the public key of the secure module (s76). The public key may be read from a database stored at the server. Having verified the signature, the server can then check the customers claim for a refund using the data contained in the receipt. This data may show, for example, a discrepancy between the number of ADUs decrypted in a session and the number transmitted by the server, thereby substantiating the customer's claim that a ADU was lost.

As noted in the introduction above, the ADU's may be decrypted in such a way that at each one of a number of customer terminals a different characteristic variation is present in the data. This variation may be generated directly in the said step of decrypting the ADUs or a watermarked key may be supplied to decrypt the ADU. In this latter case, the characteristic variation in the key automatically results in a traceable variation in the data decrypted using the key. The use of watermarked keys is described, for example, in Ross Anderson, "Chameleon—A New Kind of Stream Cipher Encryption" in Haifa in Jan. 1997.

Where digital watermarks are used, the operator of the data server, or some other interested party, may subsequently use the watermark, for example, to identify the secondary source of data copied and forwarded by one customer terminal to another. Given a sample of the data, the data server then inspects the data and compares the characterstic variations with data stored on the server that correlates the variations with respective customer terminals. Similarly the watermark may be used to detect collusion where one customer forwards keys for ADU decryption to another.

While in the examples so-far described, the ADU's are communicated over a network, in an alternative embodiment distribution is effected using a data carrier such as CD-ROM or some other portable storage medium. In this case the set up of the secure module on a smart card at the customer location is carried out as before—over the Internet. The data on the distribution medium is separated into ADUs, each with a sequence number and each encrypted with different keys as before. During reading of the data from the CD etc. the smart card generate keys, which could all be achieved off-line. However, the request for a receipt and the response are carried out on-line via the Internet or other appropriate communications network as before.

The examples described above may be used in the context of a community of interest network (COIN) or a virtual private network (VPN). In this case each source of information would split its data into ADUs and transmit each ADU encrypted with different keys across the COIN. The same ADU would always be transmitted with under the same key no matter how many times it was transmitted to different parties within the COIN. Sources of information might be direct, such as the parties involved in the COIN or indirect such as Web servers or caches commonly accessible to all parties within the COIN. In the indirect case, the information would be sent to the Web server or cache with its sequence number in the clear but data encrypted. It would be stored in the same encrypted form as it had been first transmitted. Only when the final recipient accessed the Web server or cache would their smart card generate the key for decryption and record receipt of the information. The watermarking techniques described previously could be used if tracing of who was passing on decrypted data was required.

Figure 8:
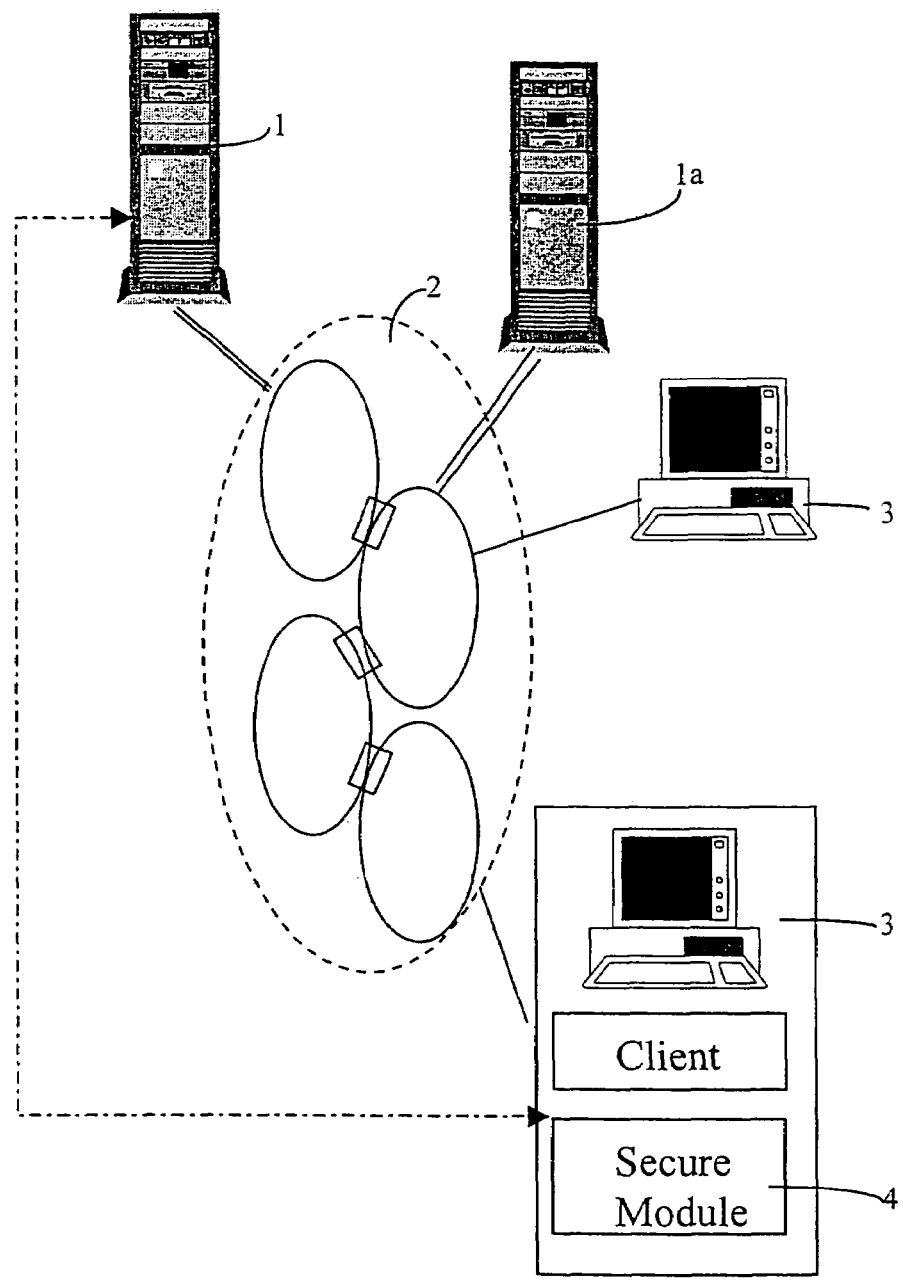
FIG. 8 shows an alternative embodiment.

FIG. 8 shows a further alternative embodiment, in which multiple data sources 1, 1a communicate data to the customer terminals. Although, for ease of illustration, only two data sources are shown, in practice the system may include many more sources. Where multiple sources are generating data, it is possible to use the invention on a per-source basis, with each receiver entering into the setup phase with each source. However, for large numbers of sources, this becomes unscalable and time-consuming. Instead, in a preferred implementation, a sequence id of any ADU arriving at any receiver consists of two parts, the sender id and the per-sender sequenceid. The sender id may be its IP address and port number, in which case these would already be in the header of each packet. The sender id acts as an offset to the primary seed to produce a secondary seed (e.g. by XORing it with the seed). Thus each smart card operates as many key sequences as it hears senders, each sequence effectively seeded from the same primary seed, but then offset to a secondary seed before starting each sequence in a similar way to the pseudo-random or chaotic seqences described below.

Whenever an ADU arrives, the sender id is examined to look-up the correct sequence, then the sequence id allows the correct key to be generated. This allows each receiver to only pass through the set up once for all senders in a multi-sender session.

The session initiator generates the primary seed and passes it to each sender using regular cryptograpic privacy (e.g. under the public key of each sender). Each sender offsets the primary seed with their own id to produce their secondary seed, which they would use to start the key sequence for ADUs they sent.

Any sender may take any receiver through the setup phase by passing it the primary seed, assuming there is some way for any sender to establish who was an authorised receiver (e.g. a list supplied and signed by the session initiator, or a token the initiator gave to each receiver in return for payment, which each receiver had to reveal to any sender).

The sequence used for generating the keys in the above examples may be distributed to customers terminals using HTTP (hypertext transfer protocol) as Java code. A suitable chaotic function is:

$$x_{n+1} = 4rx_n(1-x_n)$$

When r=1 this function takes and generates numbers in the range 0 to 1. A chaotic function such as this has the property that any errors in the value of xn grow exponentially as the function is iterated. In use, the secure module uses a higher accuracy internally than the accuracy of the key values exposed to the client. For example the secure module may use 128-bit numbers internally and then only return to the client the most significant 32 bits. In generating the key values, the chaotic function is iterated until the error in the value returned to the client grows bigger than the range. This then prevents the user guessing the sequence from the values returned by the secure module.

As an alternative or additional security measure, a different function may be used for each session. This serves to further reduce the possibility of the customer predicting sequence values.

Table 1 below list Java code for implementing a chaotic function. It returns the next number in a sequence, or the nth number in a sequence.

The key values need not necessarily be generated by a sequence. Instead other functions of the form k=f(seed, ADU i.d.), where k is a key value, may be used. For example, the binary values of the ADU identity might be used to select which of a pair of functions is used to operate on the seed value. Preferably a pair of computationally symmetric functions are used. For example, right or left-shifted XOR (exclusive OR) operations might be selected depending on whether a binary value is 1 or 0. If we label these functions A and B respectively, then, e.g., ADU number six, i.e. 110, has a key generated by successive operations AAB on the seed value.

Related inventions are described in the applicant's co-pending international application filed this day, entitled "data communications", (U.S. Ser. No. 09/555,929 filed Jun. 6, 2000).

```
/** Class to implement a chaotic sequence */
public class SecureSequence {
    protected int seqNum;
    protected double currNum;
    /** Create a SecureSequence object from a new seed */
    public SecureSequence (double currNum) {
        seqNum = 0;
        this.currNum = currNum;
    }
    /** Return the next number in the sequence */
    public int next( ) {
        ++seqNum;
        for (int i = 0; i < 20; ++i) // 20 iterations is a guess,
    could use less
            currNum = 4 * currNum * (1 - currNum);
        // return the most significant 32 bits of a 64 bit number
        return (int) ((double) Integer.MAX_VALUE * currNum);
    }
    /** Return the current sequence number of the last number
returned */
    public int SequenceNumber( ) {
        return seqNum;
    }
    /** Return the number in the sequence at the requested
position in
    the sequence */
    public int next(int seqNum) {
        // if the number is too small return zero (should really be
an exception)
        if (seqNum <= this.seqNum)
            return 0;
        // iterate through the sequence to get to the right number
        while (this.seqNum != seqNum)
            int value = next( );
        return value; 0
    }
}
```

What is claimed is:

1. A method of operating a data communications system comprising:
   a) at a remote data source, outputting a plurality of application data units (ADUs);
   b) encrypting the ADUs;
   c) communicating the ADUs to a customer terminal;
   d) in the locality of the customer terminal, decrypting the ADUs;
   e) storing a record of the ADUs decrypted in step (d); and
   f) subsequently generating a receipt for ADUs received at the customer terminal by reading record data stored in step (e).

2. A method according to claim 1, in which the record stored in step (e) is generated by a secure module located at the customer terminal.

3. A method according to claim 2, in which the secure module encrypts the record and outputs it for storage outside the secure module.

4. A method according to claim 2 in which the encrypted ADUs are passed to the secure module, and the secure module outputs decrypted ADUs.

5. A method according to claim 1 in which each of a plurality of ADUs output by the data source is encrypted with a different key, and a plurality of corresponding keys are generated at the customer terminal.

6. A method according to claim 5 in which the secure module outputs the plurality of corresponding keys and the customer terminal uses the said keys to decrypt the plurality of ADUs.

7. A method according to claim 5 in which the remote data source generates and communicates to the customer terminal a seed value and the plurality of different keys are generated from the said seed value.

8. A method according to claim 1 including applying different characteristic variations to data decrypted at different respective customer terminals.

9. A method according to claim 8, in which the characteristic variation is applied after decryption of the data by a secure module.

10. A method according to claim 8, including generating a key for decryption of data, which key includes a characteristic variation, and the said characteristic variation in the data is induced by the characteristic variation in the key.

11. A method according to claim 1 including returning the receipt to the server.

12. A data communications system comprising
a) a remote data source arranged to output a plurality of ADUs;
b) encryption means for encrypting the plurality of ADUs;
c) a communications network connected to the encryption means;
d) a customer terminal connected to the communications network and arranged to receive encrypted ADUs via the communications network;
e) decryption means located in the locality of the customer terminal and arranged to decrypt the ADUs received at the customer terminal from the communications network;
f) a store at the customer terminal for storing a record of ADUs decrypted by the decryption means;
g) means for reading record data from the store and generating thereby a receipt for ADUs received and decrypted by the customer terminal.

13. A data communications system according to claim 12, in which the communications network is a packet-switched network.

14. A data communications system according to claim 12 in which a secure module in the customer terminal is arranged to generate the said record.

15. A data communications system according to claim 14, in which the secure module is arranged to encrypt the record.

16. A data communications system according to claim 14 in which the encryption means are arranged to encrypt different ADUs with different respective keys, and the secure module is arranged to generate a plurality of keys for decrypting the plurality of ADUs received at the customer terminal.

17. A customer terminal for use in a method according to claim 1, the customer terminal comprising:
a) a data interface for receiving data from a data communications medium;
b) decryption means connected to the data interface and arranged to decrypt ADUs received via the data interface;
c) means for generating a record of ADUs decrypted by the decryption means; and
d) means for reading record data and generating thereby a receipt for ADUs received and decrypted by the decryption means.

18. A customer terminal according to claim 17, in which the means for generating a record is a secure module.

19. A customer terminal according to claim 16, in which the secure module is arranged to encrypt the record.

20. A customer terminal according to claim 18 in which the secure module is arranged to generate plurality of keys for decrypting the plurality of ADUs received at the customer terminal.

21. A method of operating a data communications system comprising:
a) at a remote data source, outputting a plurality of ADUs
b) encrypting different ones of the plurality of ADUs using different respective keys;
c) communicating ADUs to a customer terminal;
d) in the locality of the customer terminal, generating a plurality of different keys for decrypting different respective ADUs received at the customer terminal;
e) storing a readable record of the keys generated in step (d).

22. A data communications system comprising
a) a remote data source arranged to output a plurality of ADUs;
b) encryption means for encrypting the plurality of ADUs with different respective keys;
c) a communications network connected to the encryption means;
d) a customer terminal connected to the communications network and arranged to receive encrypted ADUs via the communications network;
e) a key generator programmed to generate a sequence of keys for use in decrypting ADUs:
f) decryption means connected to the key generator and arranged to decrypt the ADUs received at the customer terminal from the communications network; and
g) a store for storing a readable record of keys generated by the key generator means.

23. A customer terminal for use in a method according to claim 21, the customer terminal comprising:
a) a data interface for receiving data from a data communications medium;
b) a key generator programmed to generate a sequence of keys for use in decrypting ADUs:
c) decryption means connected to the data interface and to the key generator and arranged to decrypt ADUs received via the data interface;
d) a store containing a record of keys generated by the key generator; and
e) means for reading record data from the store and generating thereby a receipt for ADUs received and decrypted by the decryption means.

24. A method according to claim 1 including generating keys from a seed value by iterated operations on the seed value by selected ones of a plurality of predetermined functions.

25. A method according to claim 24, in which the selection of the said predetermined functions is determined by the value of a ADU identity number.

26. A method according to claim 24 in which the predetermined functions are computationally symmetric.

27. A method according to claim 26 in which the said functions are left-shifted binary XOR and right-shifted binary XOR.

28. A method of operating a data communications system comprising:
a) at a remote data source, outputting a plurality of application data units (ADUs);
b) encrypting the ADUs;
c) communicating the ADUs to a plurality of customer terminals;

d) in the locality of each customer terminal, decrypting the ADUs; and e) inducing a different characteristic variation in the value of the ADU's at different respective terminals.

29. A method according to claim 28, in which the characteristic variation is applied after decryption of the data.

30. A method according to claim 28, including generating a key for decryption of data at a respective customer terminal, which key includes a characteristic variation, and the said characteristic variation in the ADU data is induced by the characteristic variation in the key.

31. A method according to claim 28 further comprising:

f) reading decrypted ADU data; and g) determining from the characteristic variations in the ADU data the identity of a terminal at which the said data was originally received.

32. A method or system according to claim 28 in which ADU's are communicated to a customer terminal via a communications network.

33. A method or system according to claim 28 including a plurality of remote data sources, each outputting a respective plurality of ADU's.

34. A method of operating a data communications system comprising:

a) at a plurality of remote data sources, outputting a plurality of application data units (ADUs);

b) encrypting the ADUs from different remote data sources with different respective keys derived from a common seed value;

c) communicating the ADUs to a plurality of customer terminals;

d) in the locality of each customer terminal, decrypting the ADU's.

35. A method or system according to claim 33 in which the customer terminal receives a primary seed value common to different respective data streams from the plurality of data sources, and derives from the common primary key a plurality of different respective secondary seed values for decrypting ADU's from different respective data sources.

36. A method or system according to claim 35, in which data received from different data sources includes different respective source identity values, and the respective secondary seed value is generated from the primary seed value by modifying the primary seed value with the source identity value.

* * * * *